United States Patent [19]
Goker

[11] Patent Number: 5,847,892
[45] Date of Patent: Dec. 8, 1998

[54] SERVOING AND FORMATTING MAGNETIC RECORDING TAPE IN AN ARCUATE SCANNER SYSTEM

[75] Inventor: Turguy Goker, Solana Beach, Calif.

[73] Assignee: Seagate Technology, Inc., Scotts Valley, Calif.

[21] Appl. No.: 955,022

[22] Filed: Oct. 21, 1997

Related U.S. Application Data

[63] Continuation of Ser. No. 555,681, Nov. 13, 1995, abandoned.

[51] Int. Cl.$^6$ .................................................. G11B 5/00
[52] U.S. Cl. ..................... 360/76; 360/77.12; 360/73.12; 360/48
[58] Field of Search .................................. 360/71, 73.01, 360/73.04, 75, 77.01, 77.12, 83, 84, 76, 77.13, 77.15, 73.09, 73.12, 48

[56] References Cited

U.S. PATENT DOCUMENTS

| | | |
|---|---|---|
| 2,750,449 | 6/1956 | Thompson et al. . |
| 2,772,328 | 11/1956 | Lyon ...................................... 360/84 X |
| 2,900,444 | 8/1959 | Camras . |
| 2,924,668 | 2/1960 | Hoshino et al. . |
| 3,320,371 | 5/1967 | Bach . |
| 3,351,718 | 11/1967 | Banning, Jr. et al. ..................... 360/83 |
| 3,790,755 | 2/1974 | Silverman . |
| 4,112,472 | 9/1978 | Hauke et al. ........................... 360/102 |
| 4,139,871 | 2/1979 | Yoshida et al. ........................... 360/64 |
| 4,525,754 | 6/1985 | Handley .................................... 360/51 |
| 4,636,886 | 1/1987 | Schwarz .................................... 360/84 |
| 4,647,993 | 3/1987 | Schwarz et al. .......................... 360/84 |
| 4,731,681 | 3/1988 | Ogata ....................................... 360/85 |
| 5,060,104 | 10/1991 | Kitaori et al. ...................... 360/130.24 |
| 5,339,207 | 8/1994 | Moon et al. .......................... 360/77.05 |
| 5,345,345 | 9/1994 | Yamashita et al. ........................ 360/64 |
| 5,371,638 | 12/1994 | Saliba .................................. 360/77.01 |
| 5,381,277 | 1/1995 | Jaffard et al. .............................. 360/62 |
| 5,396,376 | 3/1995 | Chambors et al. ........................ 360/48 |
| 5,412,517 | 5/1995 | Fujimori .................................... 360/64 |
| 5,446,601 | 8/1995 | Fukuta ....................................... 360/46 |
| 5,448,430 | 9/1995 | Bailey et al. .......................... 360/77.01 |
| 5,453,887 | 9/1995 | Negishi et al. ....................... 360/77.01 |
| 5,488,525 | 1/1996 | Adams .................................... 360/104 |

FOREIGN PATENT DOCUMENTS

| | | |
|---|---|---|
| 63913 | 9/1984 | Japan . |
| 169716 | 12/1987 | Japan . |
| WO 93/26005 | 12/1993 | WIPO . |
| WO 95/06940 | 3/1995 | WIPO . |
| WO 96/00437 | 1/1996 | WIPO . |

OTHER PUBLICATIONS

Lissner, R.W., "Movable Head/Movable Track Accessory Arrangement", IBM Tech Disclosure Bulletin, Mar. 1977.

*Primary Examiner*—Andrew L. Sniezek
*Attorney, Agent, or Firm*—McDermott, Will & Emery

[57] ABSTRACT

An arcuate scanner in accord with the invention records information on a longitudinal tape in a predetermined format. The format includes a top servo region and a lower servo region approximately twice as wide as one data track width. The top servo region contains a burst of recorded servo signal at a predetermined location. The lower servo region contains another burst of recorded servo signal at a predetermined location. Between each pair of top and lower servo regions, the information format includes two arcuate data tracks, containing a series of data blocks of a specified format. The locations of the servo bursts in the respective servo regions alternate between two lateral positions in adjacent servo tracks. During reading operations, a read head centered over one data track will pass both the servo regions around that data track and a portion of each of the servo regions around an adjacent track. A circuit samples the amplitude of the servo signal, taken during different time windows corresponding to passage over the various servo bursts in the two tracks. One or more relationships between the amplitudes of predetermined pairs of samples are used to produce one or more position error signals. Control elements, such as a tape drive motor and a position alignment controller (e.g. tilt motor) adjust the operation of the scanner system in response to the position error signal(s).

17 Claims, 8 Drawing Sheets

SERVOING AND FORMATTING MAGNETIC RECORDING TAPE IN AN ARCUATE SCANNER SYSTEM

This application is a continuation of application Ser. No. 08/555,681 filed Nov. 13, 1995 now abandoned.

FIELD OF THE INVENTION

The present invention relates to tape drives having an arcuate scanner, and more particularly to an information format and servo control of the scanner heads based on signals within the information format, to accurately control the arcuate scanner during reading and writing operations.

DESCRIPTION OF RELATED ART

Conventional magnetic tape drive systems provide a reel-to-reel transport of magnetic tape past a fixed recording/ reading location where a stationary single-track or multiple-track head is positioned. Recording and playback are performed longitudinally with respect to the tape by moving the tape on its longitudinal axis past the stationary record/ playback head mechanism. In the stationary head tape drive, a plurality of transversely-aligned heads are fixedly positioned with respect to the tape during recording and playback. The recording heads place a plurality of parallel longitudinally-extending tracks on the tape.

Rotary head tape drive systems provide higher capacity. In such systems, magnetic head mechanisms rotate relative to the moving storage tape. The most common rotary head system, first developed for video recording, utilizes a helical scan. The tape wraps around a drum tilted at an angle with regard to the direction of motion of the tape. The drum supports two or more heads. The combination of tape motion and drum rotation produces straight tracks recorded at an angle with respect to the length (longitudinal axis) of the tape.

The application of helical scanning to data storage systems has been limited. Helical scanning requires high-pressure contact between the tape and the drum. Repeated motion of the tape across the drum for large numbers of read and/or write operations for common computer data storage and retrieval purposes causes wear on the head parts and the tapes. Also, the helical scanning mechanism tends to be large, complex and expensive.

Another known type of rotary scanning technology, however, is arcuate scan technology. In arcuate scanning, read and write scanner heads are mounted near the periphery of a circular planar surface and rotated thereon about an axis passing through the center of the circular surface and through the plane of a longitudinally-moving tape. In writing data on a tape, arcuate scanners produce a sequence of arcuately-shaped tracks which are transverse to the longitudinal axis of the tape.

Examples of arcuate scanning tape drives are described, for example, in: U.S. Pat. No. 2,750,449; U.S. Pat. No. 2,924,668; U.S. Pat. No. 3,320,371; U.S. Pat. No. 4,636,886; U.S. Pat. No. 4,647,993; and U.S. Pat. No. 4,731,681.

International Application WO 93/26005 to Lemke et al. discloses an example of an arcuate scanning tape drive for computer data storage, and the disclosure thereof is expressly incorporated herein entirely by reference. In the Lemke et al. arcuate scanning tape drive, a number of scanner heads are provided around the periphery of the circular planar surface. As the scanner rotates and the tape moves past the rotating scanner surface, the read and write heads alternately pass over the tape. The operation of the scanner is commutated or switched from "write" to "read" to alternatively activate the appropriate operation through alternate ones of the scanner heads.

To effectively read and write data in arcuate tracks on a longitudinally moving tape requires (1) writing the tracks in an agreed format, position and alignment on the tape, and (2) corresponding positioning and alignment of the read heads during the read operation to locate and recover the data written on the tracks. In an arcuate scanner of the type described, there are a number of variables which effect both the read operation and the write operation. These include tape speed, rotational speed of the scanner head and orientation of the scanner head with respect to the tape. Several of these variables are effected by external factors. For example, if there is some vibration of a scanner during the writing operation, it may be difficult to align the head with the data tracks during a read operation, particularly if the read operation is performed by a different scanner.

Figure 8:
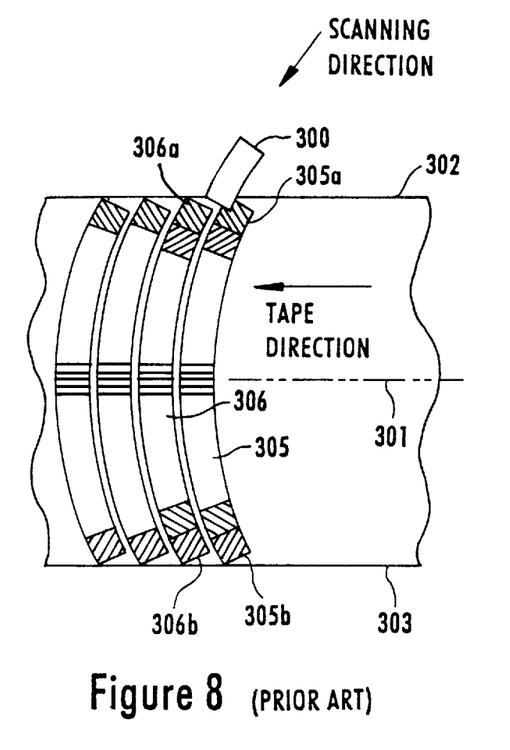
FIG. 8 depicts several tracks recorded by a prior art arcuate scanner.

The above cited Lemke et al. document discloses the most effective technique proposed in the past for controlling the relevant variables during reading and writing operations by an arcuate scanner. FIG. 8 illustrates the arcuate information format used by Lemke et al. and the relationship of servo bursts within that recorded format to a servo scanning head.

In the Lemke et al. system the servo functions employ low frequency servo information detected at the beginning and end of each scan. The low frequency servo information indicates the alignment of the scanning path traced by transducers with respect to adjacent tracks. As illustrated in FIG. 8, a servo transducer 300 scans a tape 301 in a counterclockwise scanning direction while the tape is moving from right to left as indicated, when viewed from the arcuate scanning head assembly toward the recorded side of the tape. A sequence of previously written arcuately-shaped tracks are scanned from the upper edge 302 to the lower edge 303 of the tape 301.

The servo transducer 300 passes over two adjacent tracks with each scan, and is considered to be centered when it spans the tracks from midpoint to midpoint. For example, consider the two adjacent tracks 305 and 306. The read and write heads are offset radially from the servo head 300 to ensure that they will be centered on a track so long as the servo transducer 300 is centered between two tracks. During one scan, the servo transducer 300 should span equal portions of the tracks 305 and 306 in order to ensure alignment of read and write heads with the tracks which they scan. When the servo transducer 300 is centered between the adjacent tracks 305 and 306 at the beginning of a scan, the low frequency servo bursts 305a and 306a at the beginning of those tracks provide signal responses of equal magnitude when scanned by the servo transducer 300. In this regard, equal magnitudes of the two low frequency servo bursts indicates correct positioning of the servo transducer and, by implication, of the write and read transducers. The alignment of the transducers is measured again at the end of the scan when the servo transducer 300 encounters the end-of-scan servo bursts 305b and 306b, respectively.

In the Lemke et al. system, the servo bursts of any two adjacent tracks have different frequencies. A position error signal is developed by filtering the readback signal obtained from the servo transducer 300 and subtracting the magnitudes of the separated signals. If the servo transducer spans equal portions of adjacent tracks, the magnitudes will be equal and the magnitude of the difference will be 0. If the tape is moving too fast, the readback signal generated by the servo transducer 300 in response to the servo bursts will show a greater contribution and higher magnitude from the trailing track. Subtraction of the magnitudes provides a position error signal with a non-zero magnitude and a sign corresponding to the trailing track. Alternatively, if the tape is moving at a speed somewhat slower than that at which it was recorded, the position error signal will have a non-zero magnitude with a negative sign indicating that the transducer 300 is spanning a greater portion of the leading tack than the trailing track.

The two-frequency servo control of Lemke et al. theoretically provides a highly accurate servo control of the arcuate scanner. In practice, however, there are certain problems with that type of servo control. The detection of the servo burst signals requires two different frequency filters, one for each servo frequency, adding to the complexity and expense of the scanner electronics.

Also, one servo head simultaneously detects recorded signals at both burst frequencies. As a result, the output signal from the servo head is a combination of signals of different frequencies. The combination of the signals produces complex intermodulation products or beat signals which must be filtered out. Inadequate filtering causes distortions of the relative amplitudes of the detected servo bursts. Any distortion of the relative amplitudes may introduce inaccuracies in the position control error signal and the tracking in response to that signal.

As shown by the above discussion, the analog processing circuitry required to detect the two servo bursts is overly complex, and the use of two separate servo burst frequencies simultaneously detected through one servo head may cause problems in accurately detecting the amplitude relationship and thus inaccuracies in positioning of the scanner head assembly relative to the tracks containing the two servo bursts.

SUMMARY OF THE INVENTION

The present invention overcomes the above noted problems regarding arcuate scanning and provides an enhancement in high-density storage of computer data on tape by using an information format containing alternately positioned servo signals and controlling one or more servo functions in response to relationships between amplitude samples taken during predetermined time windows.

Thus, in one specific aspect, the present invention relates to a method of writing data onto a recording tape and/or to the resulting developed tape product. During the writing operation, an arcuate scanner head assembly rotates about an assembly axis. The arcuate scanner head assembly comprises at least a first write head and a second write head radially mounted on the assembly. A capstan motor or other tape drive motor moves the recording tape longitudinally and across the assembly axis. The first write head is activated in sequence as it passes the recording tape. More specifically, that head first records a first servo region of a predetermined track width and containing a burst of servo signal at a predetermined position in the first servo region. The first write head then records a first data track of the predetermined track width. The first write head next records a second servo region of the predetermined track width and containing another burst of servo signal at a predetermined position in the second servo region. The second write head is activated in sequence as it passes the recording tape to record only a second data track of the predetermined track width. The second data track is recorded between the first and second servo regions so as to overlap the first data track by an amount less than the predetermined track width.

In the exemplary embodiments, the servo regions or tracks are approximately twice as wide in the longitudinal tape direction as are the data tracks. The servo bursts are all at the same frequency. Also in the exemplary embodiments, the first and second heads record data at different azimuth angles with respect to the longitudinal axis of the recording tape.

The above process repeats for succeeding pairs of data tracks, however, for the alternate pairs of data tracks (e.g. the third and fourth tracks) the predetermined positions of the servo bursts are offset from the positions of the corresponding bursts recorded around the first and second data tracks.

In another aspect, the present invention relates to methods and systems for accurately controlling operation of a scanner reading information recorded in the above-discussed format. During a reading operation by the scanner system, a read head passes over a predetermined track recorded on the medium and partially overlaps an adjacent track. Within a first predetermined time window when the read head passes over a servo burst region of the predetermined track, a first sample amplitude of servo burst signal from the read head is taken, e.g. corresponding to a first position within the top servo region. Within a second predetermined time window when the read head passes over the servo burst region of the adjacent track, a second sample amplitude of servo burst signal from the read head is taken, e.g. corresponding to a second position within the top servo region. One time window corresponds to a time when the head is expected to pass the servo burst in the predetermined track. The other time window corresponds to a time when the head is expected to pass the servo burst in the adjacent track. The scanner system includes circuitry for controlling at least one parameter of operation of the scanner system in response to a relationship of the first sample amplitude to the second sample amplitude.

In the exemplary embodiment, similar samples are taken for both servo regions. The resulting amplitude signals are processed to determine the relative amplitudes thereof and produce two error signals. One error signal controls tape speed, for example by controlling the speed of a capstan motor. The two error signals together are processed to develop an alignment error signal which then controls an alignment mechanism such as a tilt angle motor.

The foregoing and other features, aspects and advantages of the present invention will become more apparent from the following detailed description of the present invention when taken in conjunction with the accompanying drawings.

DETAILED DESCRIPTION OF THE ILLUSTRATIVE EMBODIMENTS

Figure 1:
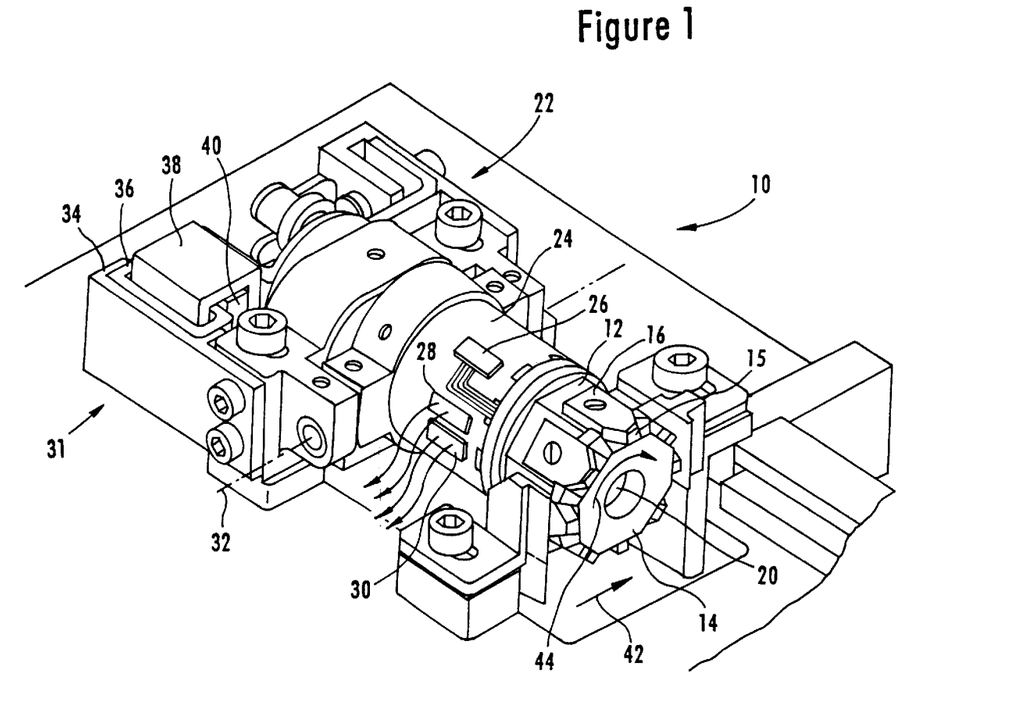
FIG. 1 is a diagram of an arcuate scanner of a tape drive, operating in accordance with an embodiment of the present invention.

FIG. 1 depicts a perspective view of an arcuate scanner head assembly (ASHA) 10 which writes and reads a sequence of arcuate tracks on a recording tape. The scanner 10 has a drum 12 with an end face 14 at which a plurality of read and write transducers are mounted on support blocks 16. A magnetic transducer 15 is mounted at the forward tip of each support block 16. The drum 12 is rotated by a rotatable shaft 20 which is mounted for rotation in a motor/bearing assembly, generally indicated by reference numeral 22. Electrical signals are transferred to and from the transducers on the drum 12 by a conventional rotary transformer assembly having a rotary piece and a stator piece (not visible in the illustrated view). The drum 12 (with the rotor) is fixed to rotate with the shaft 20. The housing 24 and stator are stationary with respect to the shaft 20. As the shaft 20 rotates together with the rotor and drum 12, electrical signals are written to and read from arcuate tracks on the recording tape by a signal path which includes the electromagnetic flux couplings between the rotor and stator. The housing 24 is essentially cylindrical and encloses the motor structure providing rotational power to the shaft 20.

The windings of the stator connect to wiring pads, one of which is shown as reference numeral 26 on the outer surface of the motor/bearing housing 24. The wiring pads 26 provide electrical connection through wiring to circuit elements.

Sensors 28 and 30 are also mounted to the housing 24 and provide, respectively, an index signal and a shaft rotational speed signal (tachometer) for each full rotation of the shaft 20.

Two different types of angles are critical to proper reading and writing operations in arcuate scanners are discussed herein. The first type of angle relates to various rotational angles, i.e. of the various scanner heads, about the central axis of the arcuate scanner head assembly. Commutation functions are controlled as a function of the rotational angle relative to the index. The other critical angle is the tilt angle of the arcuate scanner head assembly. The tilt angle affects the alignment of the scanner with the tape.

The scanner 10 is positioned at a recording location so that the planar end face 14 of the drum 12 faces a tape on which a sequence of arcuate tracks is to be written or read. The end face 14 is adjusted with respect to the edges of the tape by pivoting the housing 24, and with it the drum 12, about a pivot axis 32. The tape moves past the end face 14 in a direction indicated by arrow 42 and the drum 12 rotates in the direction of arrow 44.

A tilt motor 31 controls the angular tilting of the scanner 10 with respect to the tape. The tilt motor 31 includes a stationary bracket 34 that carries on its rear portion a conventional voice coil 36 with an open center. A U-shaped bracket 38 is affixed to the rear end of the motor/bearing housing 24 by another U-shaped bracket (not illustrated). The U-shaped bracket 38 has one leg which is received in the center of the voice coil 36 and another leg to which a permanent magnet 40 is attached. Current through the voice coil 36 sets up a magnetic field in its open center which is conducted in the U-shaped bracket 36 to the permanent magnet 40. An electromotive force is exerted on the U-shape bracket 36 and its attached magnet 40 having a magnitude determined by the magnitude of the field induced in the coil 36. The scanner 10 pivots above the pivot axis 32 by an angular amount that depends upon the relative strengths of the voice coil 36 field and the field of the permanent magnet 40, thereby selectively positioning the axis of rotation on which the shaft 20 and drum 12 rotate.

Alternative embodiments of the present invention provide other tilt or alignment mechanisms, such as a servo motor, or oppositely directed magnetic coils, as appreciated by one of ordinary skill in the art. The present invention is not limited to controlling the tilting of the scanner to control the pointing of the scanner at the recording tape. Other embodiments of the invention provide other methods of controlling the pointing position of the scanner head relative to the tape. These include controlling the elevation of the scanner with an elevator mechanism, or providing a side swing mechanism for the scanner, as one of ordinary skill in the art will appreciate.

Figure 2:
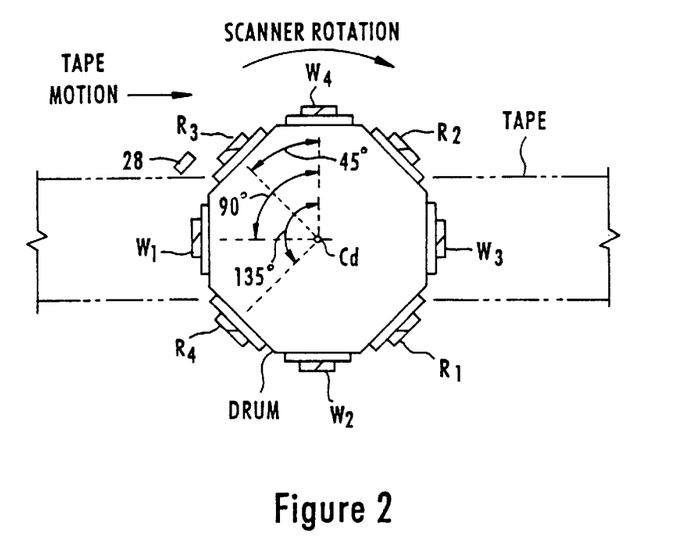
FIG. 2 is front view of the arcuate scanner head assembly, of the scanner of FIG. 1, showing the angular relationship of the read and write heads and the passage of a tape past the head assembly.

FIG. 2 is a view through a tape at the reading location towards the planar end face of the ASHA scanner drum. As shown, there are eight transducers mounted with their active surfaces extending slightly through a plane at the end face of the drum. Four transducers are designated as write transducers and are identified as $W_1$, $W_2$, $W_3$ and $W_4$. In addition, there are four read transducers identified as $R_1$, $R_2$, $R_3$ and $R_4$. Identical subscripts identify write/read transducer pairs in which the track written by numbered transducer W is later read by correspondingly numbered transducer R. For example, the transducer $W_1$ writes a track that the transducer $R_1$ later reads.

Further, the write transducers are accurately spaced on the drum by 90° in the order in which they write tracks on the tape, which is $W_1$, $W_2$, $W_3$ and $W_4$. Similarly, the read transducers are spaced from each other by 90°, but are spaced from adjacent write transducers by 45°. Further, read transducer $R_1$ is displaced by 135° in the direction opposite the scanner rotation direction from write transducer $W_1$.

The sequence traced across the tape from edge to edge when the scanner rotates in the direction indicated in FIG. 23 is: $W_4$, $R_3$, $W_1$, $R_4$, $W_2$, $R_1$, $W_3$, $R_2$. Write heads $W_1$ and $W_3$ are oriented to write at a first azimuth angle on the tape, and read heads $R_1$ and $R_3$ read information recorded at the first azimuth angle. Write heads $W_2$ and $W_4$ are oriented to write at a second azimuth angle on the tape, and read heads $R_2$ and $R_4$ read information recorded at the second azimuth angle. As thus described, when the tape speed is matched to an appropriate rotational velocity of the drum, the write transducers, when energized, will trace a sequence of contiguous recorded arcuate tracks with alternating azimuthal orientation. Similarly, the read heads sense recorded information from a sequence of arcuate tracks with alternating azimuthal orientation.

Figure 3:
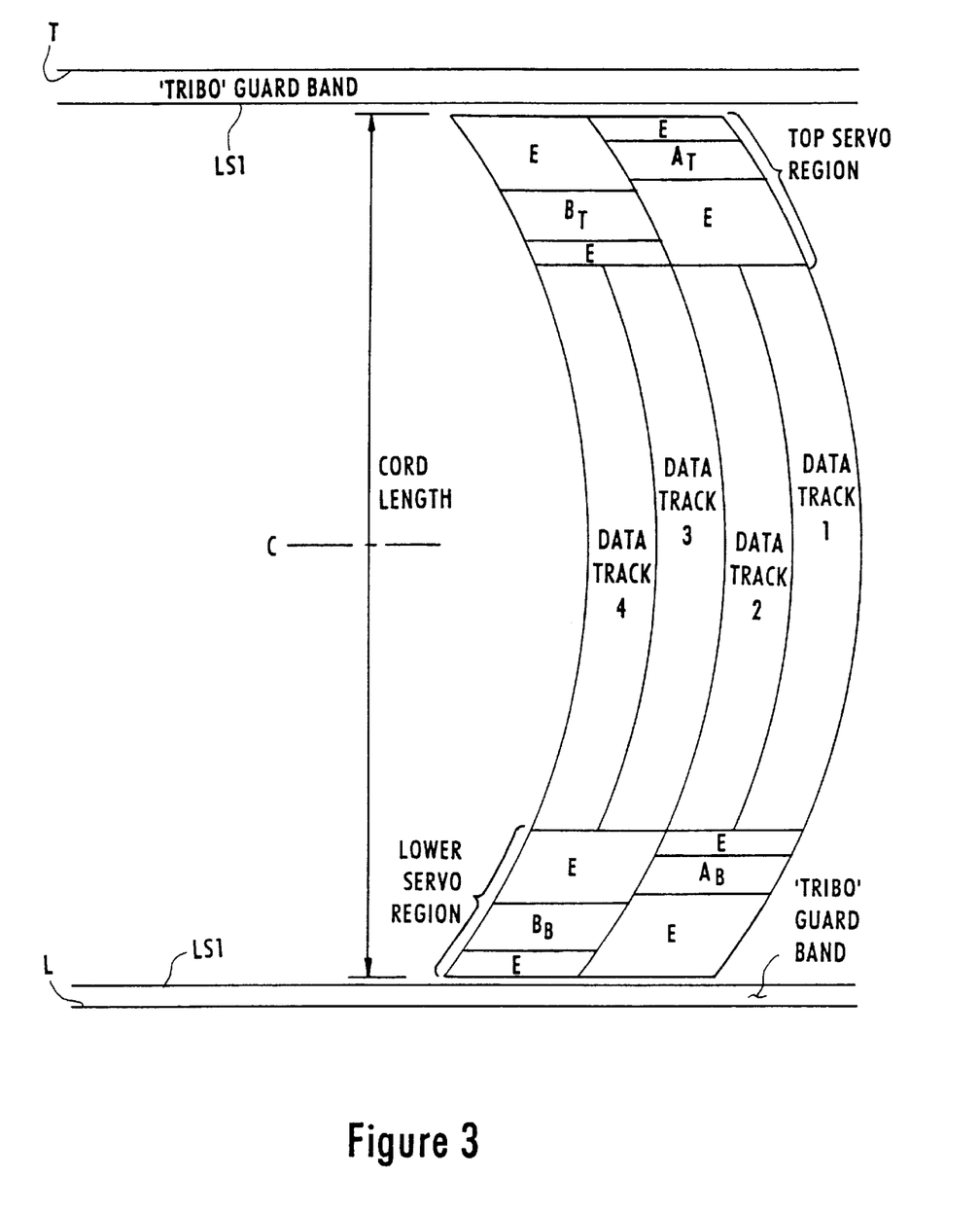
FIG. 3 is a diagram of the format of information recorded on the tape, when viewed through the tape toward the planar surface end of the arcuate scanner head assembly in FIG. 2.

FIG. 3 shows the exemplary format of the information on the developed tape in somewhat simplified form, as viewed through the tape looking towards the end face of the ASHA scanner drum in FIG. 2. It should also be noted that the various regions on the tape are not drawn to scale.

As shown in FIG. 3, the 'TRIBO' interface standard specifies a region along the top edge T of the tape as a guard band. A similar guard band extends along the lower edge L of the tape. The top guard band typically is 15 mils wide, and the lower guard band typically is 10 mils wide. Each TRIBO guard band extends for the full length of the tape. The arcuate scanner type data recording system will not write data in the guard bands.

Along the inner edge of each guard band is a magnetic stripe, designated an LS1 stripe. The tape cartridge manufacturer deeply records the LS1 stripes along the entire length of the tape. The present invention utilizes the lower LS1 stripe as a reference point. The upper LS1 stripe is not strictly necessary for the present invention, but its inclusion is exemplary.

The recorded sections of the tape are spaced from the upper and lower guard bands and LS1 stripes by a specified distance, e.g. 1.0 mils.

The actual data tracks are bounded by a top servo region and a lower servo region. In the developed tape product with information recorded thereon, the servo regions or tracks are approximately twice as wide as the data tracks when measured in the direction of the longitudinal tape axis. Within these regions bursts A and B of servo frequency signals are recorded at predetermined locations. During the writing operation, the scanner writes predetermined amounts of erase signals before and after the respective servo bursts. During a subsequent read operation, a predetermined read head partially overlaps data tracks in such a manner that it detects differing predetermined amounts of the A and B servo bursts during different time windows. The scanner system uses comparisons of the detected amplitudes of the various A and B servo bursts as a servo control, e.g. for servo control of tape speed and/or ASHA tilt angle.

All timing and orientation functions for servo control, data read commutation, and data write sampling are based on detection of the lower LS1 stripe and various known positional relationships between the ASHA components, as described in detail in commonly assigned copending application Ser. No. 08/557,772 filed Nov. 13, 1995 entitled "Method and Arrangement for Servoing and Formatting Magnetic Recording Tape", the disclosure of which is incorporated herein entirely by reference.

The recorded information on the tape forms arcs. A straight line across an arc, extending from one end to the other, forms a chord. For a tape of a given width having known guard bands and predetermined spacing from the edges of the guard bands, the chord length becomes a known value. For example, for common quarter inch magnetic recording tape, the tape is typically about 247 mils wide. The top guard band is 15 mils, the lower guard band is 10 mils, the desired spacing from the top guard band is 1 mil, and the desired spacing from the lower guard band is 1 mil. The chord length therefore should be about 220 mils.

During both reading and writing to the tape, it is critical to maintain alignment of the center of the ASHA with the center of the information recording area, shown as center line C in FIG. 3. This center line C generally passes through the center of the chord length of each recorded arc. Because of the differences in the guard band dimension, the center line C does not coincide with the physical center line of the tape. In the above example, the chord length is 220 mils. The center of the chord is 110 mils from either end of the arc, or approximately 111 mils above the lower LS1 stripe. The referencing to the LS1 stripe described in detail in the above-cited copending case maintains the desired alignment of the ASHA with the center line.

FIGS. 4A to 4D together illustrate the recording of a sequence of tracks on the tape in accord with the present invention. For convenience of illustration, these drawings do not show the curvature of the arcuate tracks. The various write heads are approximately twice as wide as the desired data track width in the direction of the longitudinal tape axis.

Two of the write heads $W_1$ and $W_2$ write servo information and data. The other two write heads $W_2$ and $W_4$ write only data information. During reading operations, the read heads $R_1$ and $R_2$ read servo information and data, and the read heads $R_2$ and $R_4$ read only data information. As noted above, the write heads $W_1$ and $W_3$ are oriented to write at a first azimuth angle on the tape, and read heads $R_1$ and $R_3$ read information recorded at the first azimuth angle. Write heads $W_2$ and $W_4$ are oriented to write at a second azimuth angle on the tape, and read heads $R_2$ and $R_4$ read information recorded at the second azimuth angle.

Figure 4A:
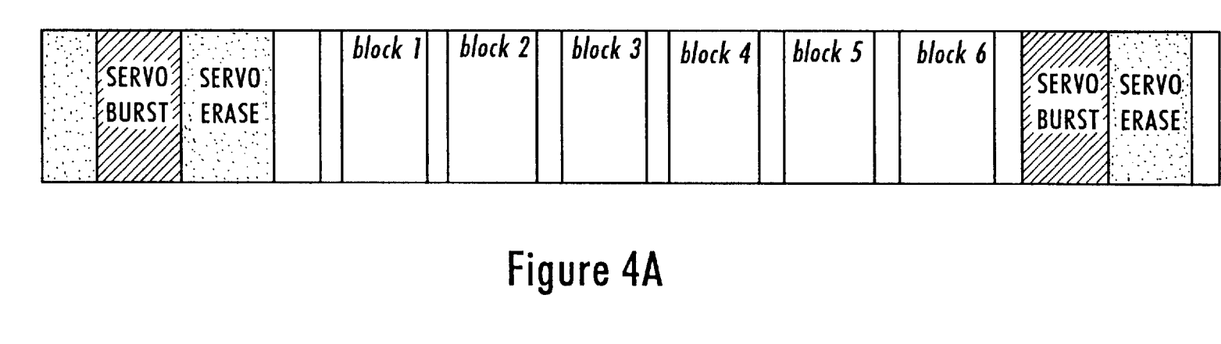
FIGS. 4A to 4D illustrate the process of writing a sequence of four tracks on the tape, to produce an information format in accord with the present invention.

In FIG. 4A, the first write head $W_1$ passes down across the tape (left to right in the drawing) and records a sequence of signals on the tape, as shown. First the write head $W_1$ records a pad of erase signal information at frequency f. Next, the write head $W_1$ records a predetermined burst of servo frequency signal. The servo frequency signal preferably is produced by dividing the erase frequency signal by an even integer, for example, the servo frequency could be f/4. The servo burst is written at a specific location on the track. In the first write operation, this first servo burst is in the top servo region and within that region is nearer to the top edge of the information area on the tape. This first top servo burst is designated as servo '$A_T$' (See FIG. 3).

Figure 4B:
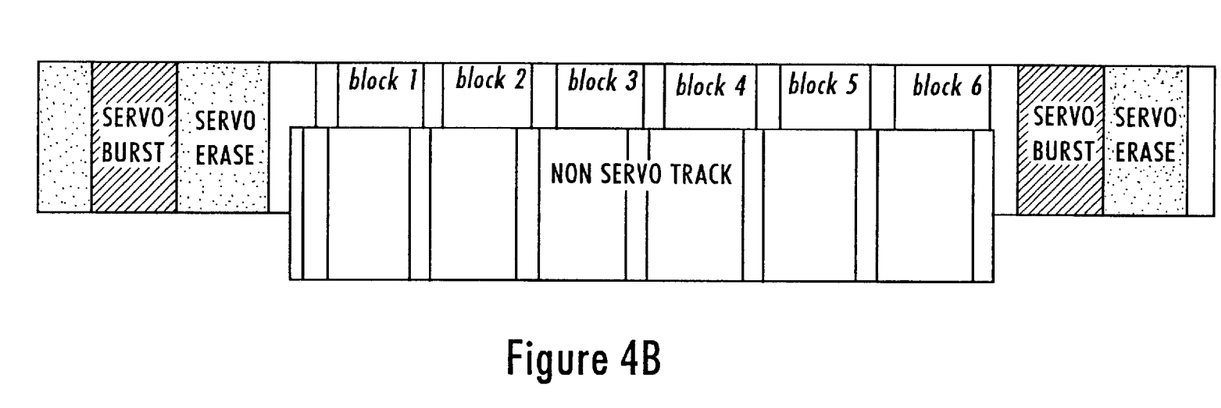

After the servo burst $A_T$, the first write head $W_1$ records another predetermined amount of the erase signal to fill the remaining portion of the top servo region for the present recording pass. At this point, the write head $W_1$ reaches a point on the tape where data should begin. The scanner system controller therefore supplies data to the write head $W_1$, and that head begins recording the data on the tape. The head records a pad, followed by six blocks of data separated by pads, and a final pad. FIG. 4E shows the format of each data block in detail.

After writing the data, the first write head $W_1$ reaches the lower servo region. In this region, the write head $W_1$ records a pad of erase signal information at frequency f followed by another predetermined burst of servo frequency signal, e.g. at f/4. This lower region servo burst is located nearer to the recorded data than to the bottom of the information recording area and is designated as servo '$A_B$'. After the lower servo burst $A_B$, the write head $W_1$ records another erase signal pad to complete the lower servo region. At this point, the scanner system controller deactivates the writing operation through the first write head $W_1$, approximately 1 mil above the lower LS1 stripe.

The first write head $W_1$ writes all of the information shown in FIG. 4A at a first azimuth angle with regard to the longitudinal axis of the tape. All information recorded at that angle is readable by read heads oriented at the same azimuth angle, e.g. read heads $R_1$ and $R_3$.

The second write head $W_2$ passes down over the tape. The second write head $W_2$ does not write any information in the servo regions, this write head writes only data (see FIG. 4B). More specifically, when the write head $W_2$ reaches the position on the tape where data should begin, the scanner system controller supplies data to the write head $W_2$, and that head begins recording the data on the tape. The drawing shows this data track as a 'non-servo track'. In the non-servo track, the second write head $W_2$ records a pad, followed by six blocks of data separated by pads, and a final pad.

The width of the write heads is approximately twice the final track pitch or width. The information written by the first head $W_1$ is the same width as that head and therefore is approximately two tracks wide. When the second write head $W_2$ begins writing, the tape has moved only one track pitch. As shown, the second write head $W_2$ writes the second track of data overlapping the first track of data by a predetermined amount, e.g. about fifty percent.

The second write head $W_2$ writes the non-servo track of data shown in FIG. 4B at a second azimuth angle with regard to the longitudinal axis of the tape. All information recorded at that angle is readable by read heads oriented at the same azimuth angle, e.g. read heads $R_2$ and $R_4$.

Figure 4C:
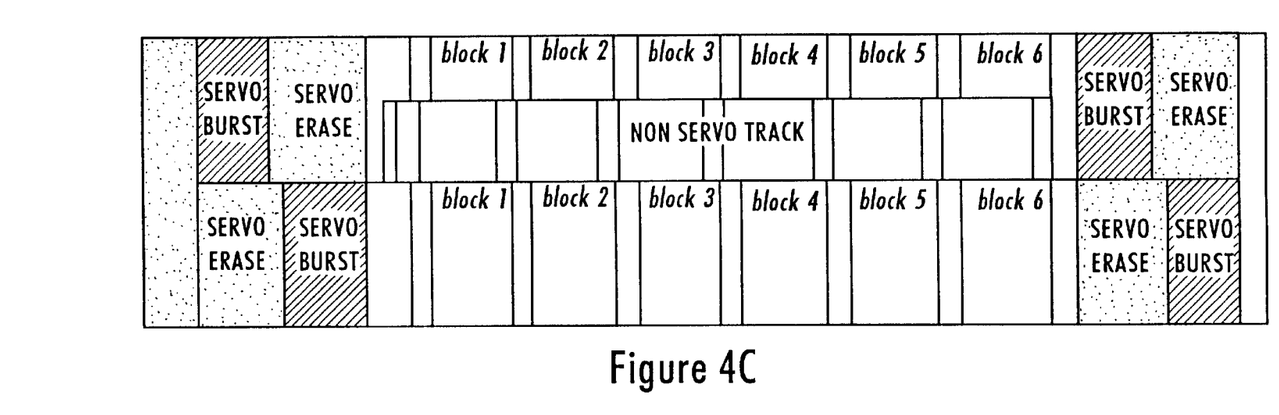

In FIG. 4C, the third write head $W_3$ passes down across the tape (left to right in the drawing) and records a sequence of signals on the tape. This sequence of signals is similar to those recorded by the first write head $W_1$, but as discussed below, the servo bursts are located at different points.

First the write head $W_3$ records a pad of erase signal information at frequency f. Next, the write head $W_3$ records a predetermined burst of servo frequency signal, e.g. f/4. The servo burst is written at a specific location on the track. In the third write operation, the servo burst within the top servo region is nearer to the top of the data recording area than to the top edge of the information area on the tape. This top servo burst is designated as servo '$B_T$' (see FIG. 3).

After the servo burst $B_T$, the third write head $W_3$ records another predetermined amount of the erase signal (relatively small) to fill the remaining portion of the top servo region for the present recording pass. At this point, the write head $W_3$ reaches a point on the tape where data should begin. The scanner system controller therefore supplies data to the write head $W_3$, and that head begins recording the data on the tape. The head records a pad, followed by six blocks of data separated by pads, and a final pad.

After writing the data, the third write head $W_3$ reaches the lower servo region. In this region, the write head $W_3$ records a pad of erase signal information at frequency f followed by another predetermined burst of servo frequency signal, e.g. at F/4. This lower region servo burst is located nearer to the lower edge of the information recording area on the tape and farther from the recorded data and is designated as servo '$B_B$'. After the lower burst servo burst $B_B$, the write head $W_3$ records another erase signal pad to complete the lower servo region. At this point, the scanner system controller deactivates the writing operation through the third write head $W_3$, approximately 1 mil above the lower LS1 stripe.

When the third write head $W_3$ begins its operation, the tape again has moved a distance of approximately one track pitch. The third write head $W_3$ therefore writes the third track overlapping the second track by approximately fifty percent. The third write head $W_3$ writes all of the information shown in FIG. 4C at the first azimuth angle with regard to the longitudinal axis of the tape. All information recorded at that angle is readable by read heads oriented at the same azimuth angle, e.g. read heads $R_1$ and $R_3$.

Figure 4D:
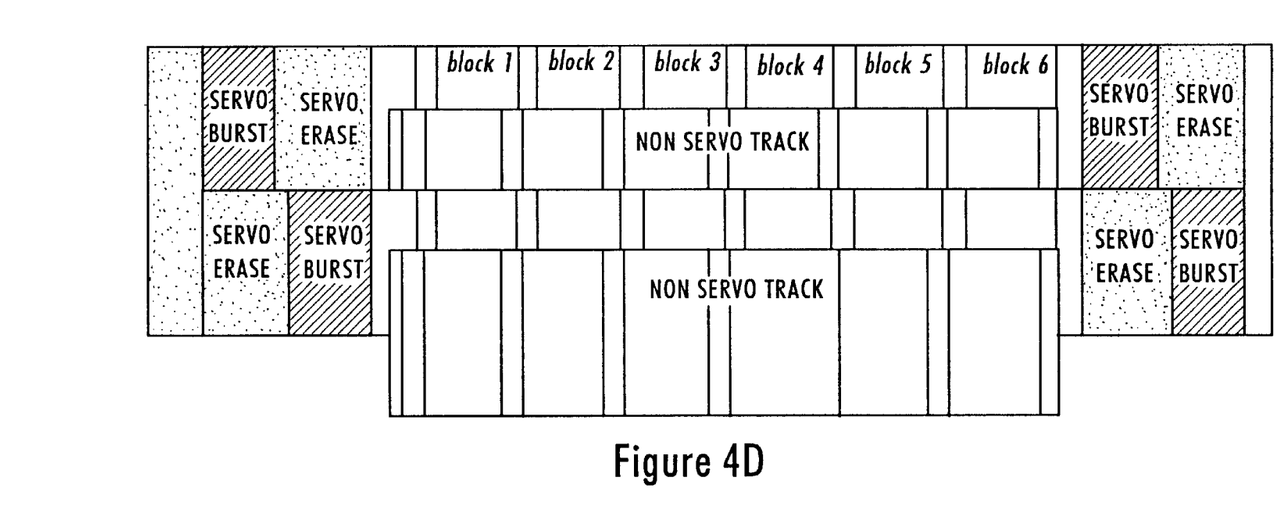
Figure 4E:
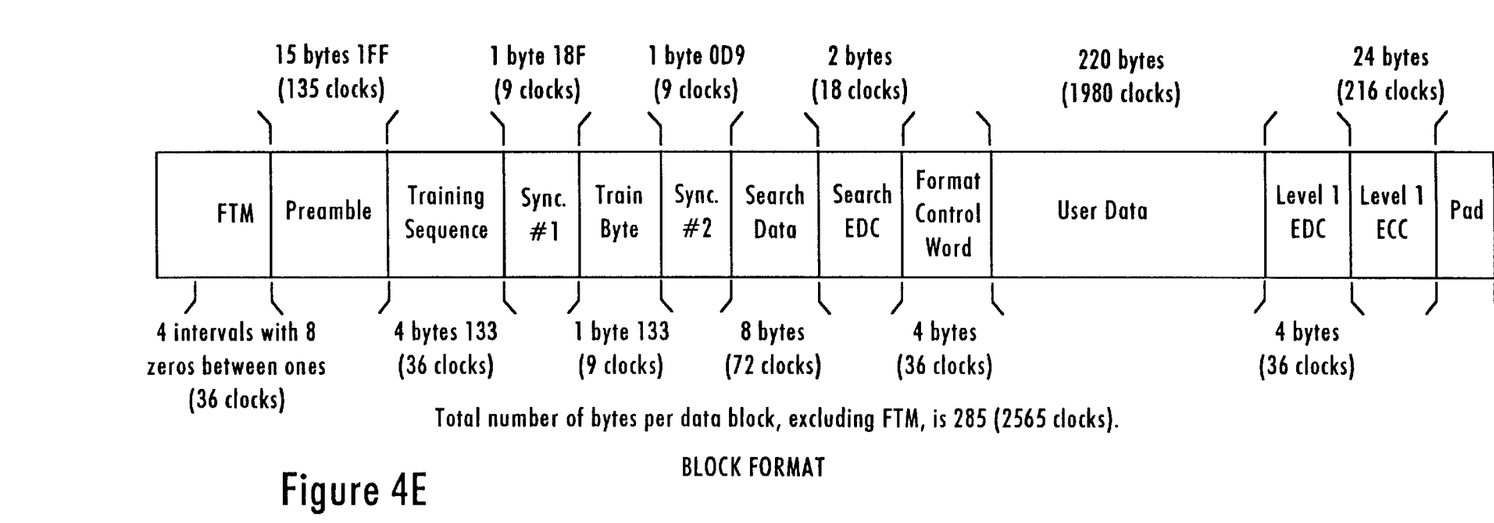
FIG. 4E shows the format of the digital information within the data blocks in the recorded format of FIGS. 4A to 4D.

The fourth write head $W_4$ operates in essentially the same manner as the second write head $W_2$, discussed above. As the fourth write head $W_4$ passes down over the tape, that head writes another non-servo track of data only. The fourth write head $W_4$ writes that track overlapping the third data track as shown in FIG. 4D. The fourth write head $W_4$ writes the fourth data track at the second azimuth angle. The information recorded at that angle in the fourth track is readable by read heads oriented at the same azimuth angle, e.g. read heads $R_2$ and $R_4$.

The track recording sequence illustrated in FIGS. 4A to 4D repeats for each rotation of the ASHA during a data recording operation. Preferably, the read heads alternately scan the recorded tracks during the data recording operation. Although not shown, error detection circuitry responsive to the read signals detects errors, if any, in the recorded tracks. In response to the errors, the system can re-record data.

FIG. 4E illustrates the format of the digital information recorded in one of the data blocks. The data block begins with a format timing mark (FTM). The FTM is a predetermined sequence of '1s' and '0s' indicating the start of the data block. In the illustrated example, the FTM comprises four intervals with eight '0s' between '1s'. As the read head passes over a data track, the associated signal processing circuitry looks for this unique sequence of '1s' and '0s' in predetermined time windows when the start of blocks of data are expected. The processing circuitry will process the bits following a detected FTM on the assumption that the bits are arranged in accord with the illustrated data block format.

After the FTM, the data block includes a 15 byte preamble followed by a 4 byte training sequence. Next, the block includes a sequence of three bytes comprising a first byte of synchronization information, another training byte and a second byte of synchronization information.

The data block next contains 8 bytes of search data followed by a two byte Search EDC signal. The search information in these portions of the data block facilitate high speed search operations.

After the search data, the data block includes a format control word (4 bytes) followed by 220 bytes of actual user data. After the user data, the data block includes 4 bytes of level EDC information and ends with 24 bytes of level ECC data. The end of the data block is followed by a padding signal separating the data block from the next information recorded information, e.g. from the next data block or from the erase signal at the start of the lower servo region.

In accord with the present invention, a number of parameters effecting read and write operations of the arcuate scanner system are servo controlled in response to detection of relative amplitudes of the servo bursts.

The read heads are somewhat wider than the data track width. When properly centered on a track, a read head will overlap slightly onto adjacent track areas. In the data areas, because of the different azimuth angles during recording, the read head picks up the signals only from the data track it is reading, i.e. the data track written using the azimuth angle corresponding to that of the particular read head. For read heads $R_1$ and $R_3$, the heads are oriented at the same azimuth angle as the servo and data write heads $W_1$ and $W_3$, therefore the read heads $R_1$ and $R_3$ pick up servo signals as well as data signals. Because these heads are wider than one data track, each of these heads will pick up some portion of the A servo signals and some portion of the B servo signals, albeit at different times. The various tracking functions are then controlled by determining the proportional amount of each A and B signal picked up by each of the read heads $R_1$ and $R_3$.

Consider the read head $R_3$ as an example, and assume that head is centered to read data track 3 in FIG. 3. As that head passes over the top servo region, signals from the head are sampled in a first servo time window, selected to be within the period that the head should go past the servo region $A_T$. The head overlaps the $A_T$ servo burst by some relatively small amount, e.g. 30%. During a second servo time window, selected to be within the period that the head should go past the servo region $B_T$, signals from the read head are sampled again. When centered on the data track 3, the read head $R_3$ should overlap the servo region $B_T$ by a relatively large amount, e.g. 70%.

The exemplary relationship between A and B servos is 70/30 (or 30/70 for read by head $R_1$), though the relationship may range from 60/40 to 80/20. A determination of the relationship of the actual sampled amplitudes can then be used to produce an error signal indicating a difference from the amplitude relationship expected when the read head $R_1$ or $R_3$ is centered over the corresponding data track. A similar error signal can be developed by time window sampling of the servo bursts $A_B$ and $B_B$ in the lower servo region.

The error signals then control various scanner parameters effecting tracking, such as tape speed and ASHA pointing alignment (e.g. tilt angle). Specific control operations are described in detail below.

Figure 5:
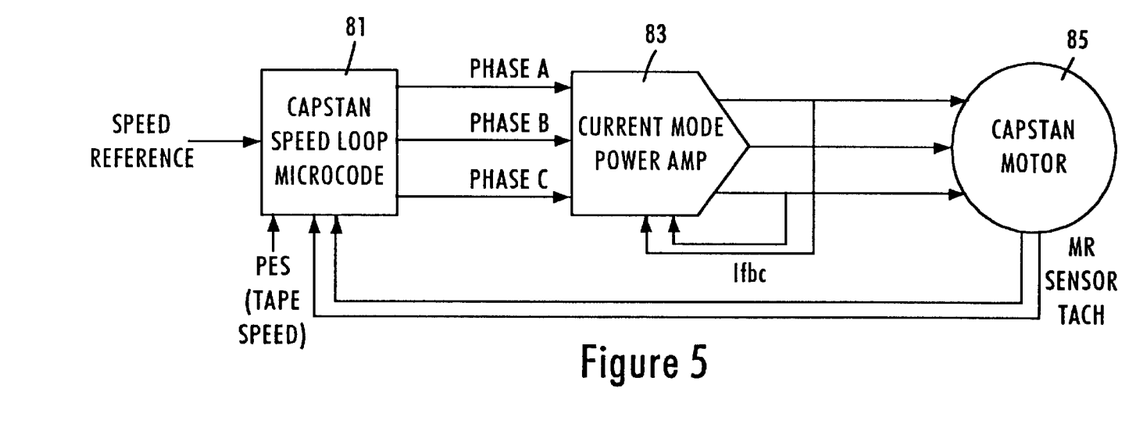
FIG. 5 is a functional/logic diagram of the tape speed control used with the invention during a write operation.

FIG. 5 is a simplified functional block diagram of the control loop for controlling the tape speed, and the operation of that loop will be discussed first for a write operation. The capstan motor 85 moves the tape. A current mode power amplifier 83 (sine/cosine type driver) provides drive signals to the capstan motor 85. Variations in the driver signals from the current mode amplifier 83 cause changes in the speed of the capstan motor 85 and therefore in the speed of the recording tape. The current controlled motor 83 operates in a feedback controlled loop.

A microcontroller (not shown) runs a capstan speed loop 81 as part of its microcode program controlled operations. The capstan speed loop microcode 81 outputs three signals representing the phase inputs A, B and C to the current mode amplifier 83. The three phase signals are analog signals, either produced directly by the microcontroller itself or by three digital to analog converters (not separately shown). The Phase A, B and C signals effectively specify the desired speed of the capstan motor 85 and thus the tape speed.

On the capstan motor 85, there is a magneto-resistance (MR) sensor. The MR sensor is a sine/cosine type of sensor. The zero crossings of the sensor output signal provide speed related information (tachometer). The amplitude of the sensor output signal provides position information.

The capstan speed loop microcode 81 receives a reference signal and the MR sensor signal and controls the capstan motor 85 through the amplifier 83 to run a tape capstan at a constant speed, e.g. to provide 0.717 in/s tape speed. A write operation utilizes this constant capstan speed. During a read operation, however, the capstan speed is modulated to correct tracking errors in response to the servo signals, as discussed in more detail below. For this purpose, during the read operation, the capstan speed loop microcode 81 also is responsive to a tape speed position error signal (PES).

Figure 6:
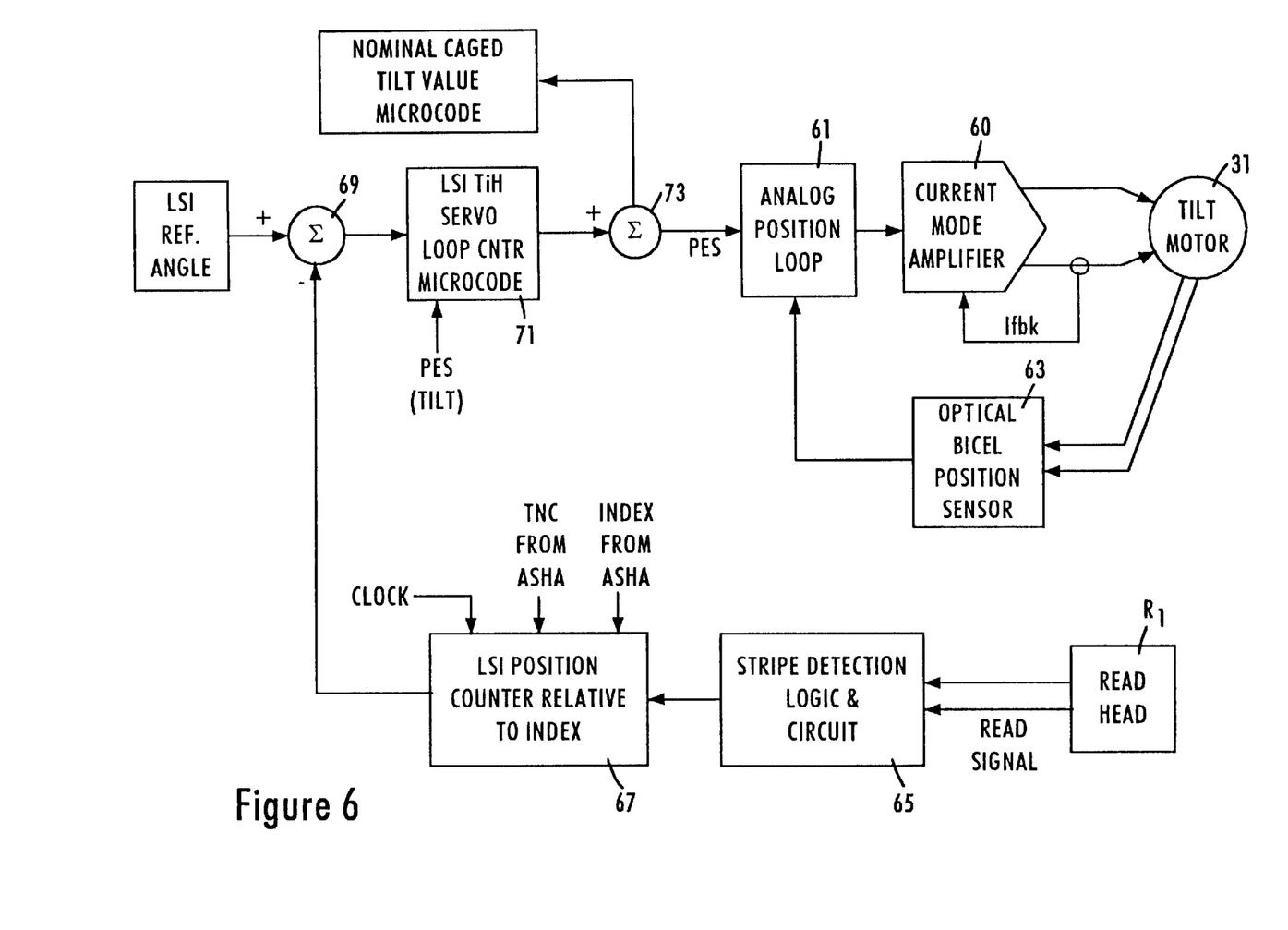
FIG. 6 is a functional/logic diagram of the servo control of the tilt angle of the arcuate scanner head assembly during a write operation, in accord with the invention.

FIG. 6 is a simplified functional block diagram of the control loop for controlling the tilt angle. For simplicity of discussion, this drawing shows only one read head $R_1$, but it will be readily apparent that similar processing occurs with respect to other heads on the ASHA.

The ASHA 10 has a tilt motor 31, for example, comprising the elements 34, 36, 38 and 40 of FIG. 1. The tilt motor 31 responds to signals from a current mode amplifier to adjust the tilt angle of the ASHA 10. An analog position loop 61 provides a control current signal to the current mode amplifier 60. An optical position sensor 63 detects the actual position of the ASHA produced by the tilt motor 31 and supplies a position sensor signal to the analog position loop 61. The analog position loop 61 also is responsive to a position error signal (PES).

The tilt control of the present invention operates during both read and write operations to maintain proper alignment. Consider first a write operation.

In operation, one of the read heads crosses the lower LS1 stripe, e.g. read head $R_1$. The read head $R_1$ supplies signals to stripe detection logic and associated circuitry 65. The stripe detection logic and circuitry 65 produces a pulse signal in response to the passage of the read head $R_1$ over the magnetized lower LS1 stripe. If two similar LS1 stripes are provided on the tape, e.g. upper and lower stripes as in FIG. 3, then the logic and circuitry 65 will differentiate between the two, for example based on a timing or sequence analysis.

The stripe detection logic and circuitry 65 supplies the LS1 pulse signal to a microcontroller (not shown in detail). Within the microcontroller, a microcode process is running to count position pulses relative to index 28 to identify the LS1 position relative to the index. This microcode routine appears at 67 in FIG. 6. The LS1 position routine 67 receives the LS1 detection pulse, the tachometer (revolutions per minute) reading from the sensor 30, the ASHA index position from the sensor 28 (one per revolution) and a clock signal. From that information, the LS1 position routine 67 produces coarse and fine count values for the position of the LS1 crossing relative to the index.

The count values for the current position are applied to the negative input of a summation circuit 69. The summation circuit 69 also receives coarse and fine values for a reference angle for the LS1 crossing relative to the index.

The summation circuit produces a difference or error signal representing the difference between the measured LS1 position relative to index and the reference LS1 position relative to index. The summation circuit 69 supplies this error signal to another microcode routine 71 of the microcontroller. This routine is the LS1 tilt servo loop control microcode.

The microcode routine 71 produces an analog position error signal (D/A converter not shown), and the analog signal is summed with a reference analog position signal in a second summation circuit 73. The result of this summation goes to the analog position loop 61 as the position error signal (PES). As the LS1 stripe moves up and down during the writing operation, the loop control of FIG. 6 adjusts the current applied to the tilt motor 31 to keep the LS1 angle of the read head constant as measured with respect to the angular rotation index of the ASHA.

All of the tracks are written using the closed loop control of FIG. 6, so that the tracks all end a specified distance (e.g. 1 mil) above the lower LS1 stripe. During a read operation, the ASHA pointing alignment (e.g. tilt angle) is modulated to correct tracking errors in response to the servo signals, as discussed in more detail below. For this purpose, during the read operation, the tilt servo loop control microcode 71 also is responsive to a tilt angle position error signal (PES).

The same tape speed control loop (FIG. 5) and tilt angle control loop (FIG. 6) operate during the reading operation. In the reading operation, however, the control signals are modulated with servo responsive position error signals (PESs) to fine tune the tracking. The fine tuning of the tracking relies on timed detection of the servo bursts in adjacent tracks, as discussed below with regard to FIG. 7.

Figure 7:
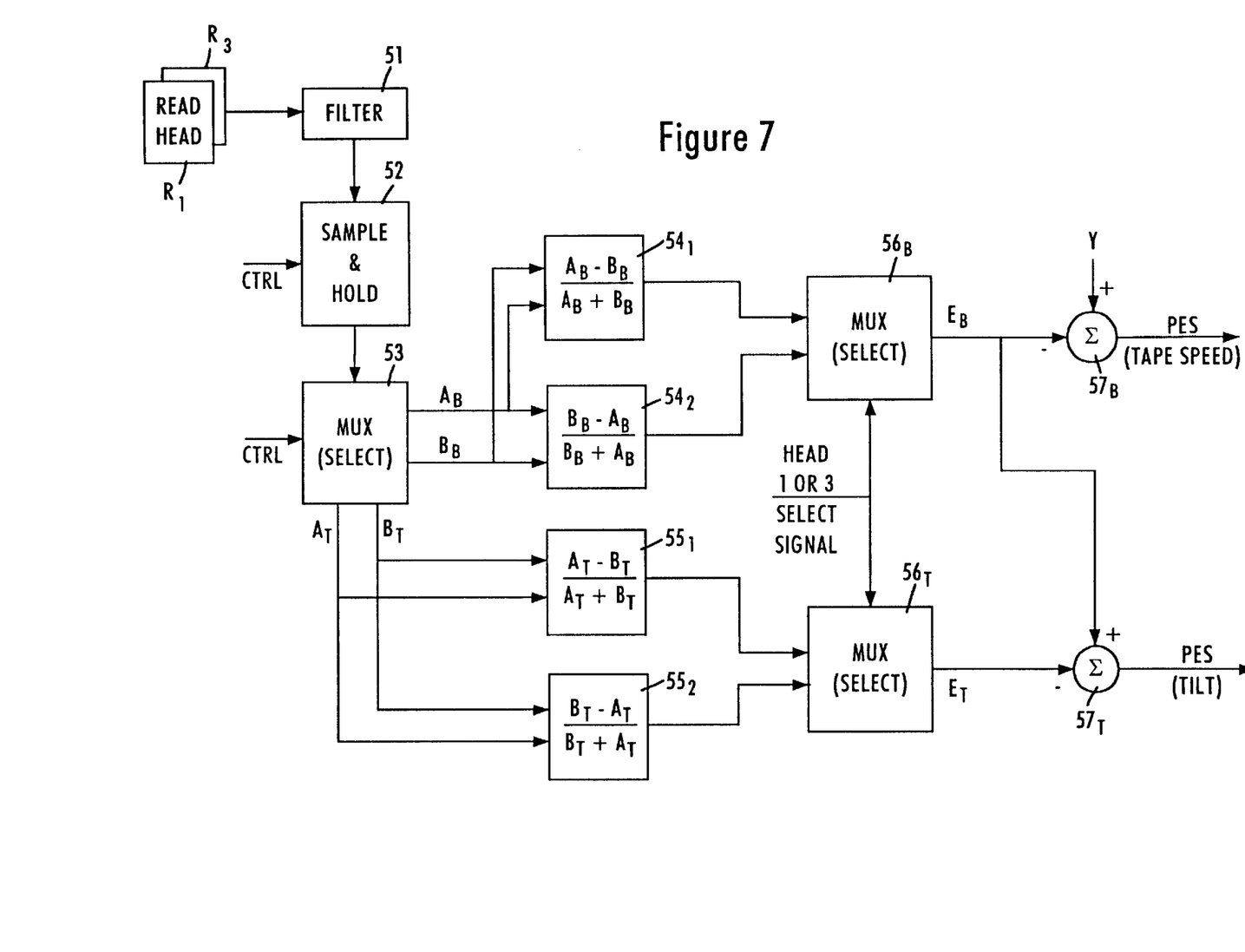
FIG. 7 is a functional/logic diagram of the servo control signal processing for modifying the control functions of FIGS. 5 and 6 during a read operation, in accord with the invention.

FIG. 7 provides a simplified functional/logic block diagram of the system for providing the tape speed PES signal and the tilt angle PES signal for servo control in response to read head pick-up of the servo bursts.

As shown in FIG. 7, output signals from the read heads $R_1$ and $R_3$ designated for servo processing go to a filter 51. The filter 51 is a passband filter for passing signals of the one frequency used for servo bursts. As noted above, the servo frequency signal preferably is produced by dividing the erase frequency signal by an even integer, for example, the servo frequency could be f/4. The filter passes signals in a narrow frequency band centered around that servo frequency, e.g. around f/4.

The output of the filter 51 goes to a sample and hold circuit 52. In response to an appropriately timed control signal from the microcontroller (not shown), the sample and hold circuit 52 samples the amplitude of the signal from the filter 51. The sample and hold circuit 52 supplies the sample amplitude to a multiplexer 53. The multiplexer (MUX) 53 serves as a one-in to four-out selector circuit. In response to an appropriately timed control signal, the multiplexer 53 outputs the current sample of the servo amplitude value to a predetermined one of its four outputs. Together, the sample and hold circuit 52 and multiplexer 53 perform a time window controlled sampling function to effectively sample the relative amplitudes of the $A_T$, $B_T$, $A_B$ and $B_B$ servo bursts.

More specifically, during a first time window corresponding to a time when a read head is expected to pass at least partially over the $A_T$ servo burst, the microcontroller supplies the control signal to the sample and hold circuit 52 to sample the servo frequency signal output of the filter 51. The microcontroller also instructs the multiplexer 53 to output the sample to a port assigned for the output of the $A_T$ signal.

During a second time window corresponding to a time when a read head is expected to pass at least partially over the $B_T$ servo burst, the microcontroller supplies the control signal to the sample and hold circuit 52 to sample the servo frequency signal output of the filter 51. The microcontroller also instructs the multiplexer 53 to output this second sample to a port assigned for the output of the $B_T$ signal.

During a third time window corresponding to a time when a read head is expected to pass at least partially over the $A_B$ servo burst, the microcontroller supplies the control signal to the sample and hold circuit 52 to sample the servo frequency signal output of the filter 51. The microcontroller also instructs the multiplexer 53 to output this third sample to a port assigned for the output of the $A_B$ signal.

During a fourth time window corresponding to a time when a read head is expected to pass at least partially over the $B_B$ servo burst, the microcontroller supplies the control signal to the sample and hold circuit 52 to sample the servo frequency signal output of the filter 51. The microcontroller also instructs the multiplexer 53 to output this fourth sample to a port assigned for the output of the $B_B$ signal.

The $A_B$ and $B_B$ signals from the multiplexer 53 go to two relative value analysis circuits $54_1$ and $54_2$. The $A_T$ and $B_T$ signals from the multiplexer 53 go to a second pair of relative value analysis circuits $55_1$ and $55_2$. These circuits may be constructed as hard wired analog circuits using operational amplifiers or the like. Alternatively, the sample and hold circuit may supply samples through an analog to digital converter, in which case the multiplexer is a digital selection circuit for passing a predetermined number of bits to the four outputs, and the relative value analysis circuits are implemented as digital processing loops running in microcode within the microcontroller.

Each of the relative value analysis circuits $54_1$, $54_2$, $55_1$ and $55_2$ divides the difference between one pair of the A and B servo signal amplitudes by the sum of those two amplitudes. For read head $R_1$ centered over track 1 (FIG. 3), it is expected that the A burst amplitudes will be larger than the B burst amplitudes, therefore the B amplitude value is subtracted from the A amplitude value in circuits $54_1$, $55_1$. For read head $R_3$ centered over track 3, it is expected that the A burst amplitudes will be smaller than the B burst amplitudes, therefore the A amplitude value is subtracted from the B amplitude value in circuits $54_2$, $55_2$.

The first pair of relative value analysis circuits $54_1$ and $54_2$ calculate the amplitude relationship between the bottom servo bursts. The relative value analysis circuit $54_1$ subtracts the $B_B$ amplitude from $A_B$ amplitude and divides the amplitude difference by the sum of those two amplitudes. The relative value analysis circuit $54_2$ subtracts the $A_B$ amplitude from $B_B$ amplitude and divides the amplitude difference by the sum of those two amplitudes.

A multiplexer $56_B$ responds to a control signal from the microcontroller to select the output of the relative value analysis circuits $54_1$ and $54_2$ corresponding to the current read head. The multiplexer $56_B$ is a two-in to one-out selector. If read head $R_1$ is passing over the track, then the control signal instructs the multiplexer $56_B$ to select and output the signal from the relative value analysis circuit $54_1$ as the error signal $E_B$. If read head $R_3$ is passing over the track, then the control signal instructs the multiplexer $56_B$ to select and output the signal from the relative value analysis circuit $54_2$ as the error signal $E_B$.

The multiplexer $56_B$ supplies the error signal $E_B$ to the negative input of a summation circuit $57_B$. The positive input of the summation circuit $57_B$ is a reference signal. The summation circuit output is the position error signal (PES) for the tape speed control loop. For example, if an 80–20 ratio of A to B is expected, when tracking is correct, either of the circuits 54 will output a ratio signal of 0.6. The reference value would be 0.6, and the summation circuit therefore will output a 0.0 value PES signal indicating correct tracking.

The PES signal for tape speed control goes to the tape speed control circuit of FIG. 5. In that circuit, the capstan speed loop microcode loop 81 adjusts the capstan speed in response to that error signal to maintain tracking. For example, if the PES signal for tape speed is a negative value, the capstan speed loop microcode loop 81 causes the capstan drive to speed up until tracking alignment is detected and indicated by the PES signal for tape speed returning to 0.0. If the PES signal for tape speed is a positive value, the capstan speed loop microcode loop 81 causes the capstan drive to slow down until tracking alignment again is detected and indicated by the PES signal for tape speed returning to 0.0.

The second pair of relative value analysis circuits $55_1$ and $55_2$ calculate the amplitude relationship between the bottom servo bursts. The relative value analysis circuit $55_1$ subtracts the $B_T$ amplitude from $A_T$ amplitude and divides the amplitude difference by the sum of those two amplitudes. The relative value analysis circuit $55_2$ subtracts the $A_T$ amplitude from $B_T$ amplitude and divides the amplitude difference by the sum of those two amplitudes.

A multiplexer $56_T$ responds to a control signal from the microcontroller to select the output of the relative value analysis circuits $55_1$ and $55_2$ corresponding to the current read head. The multiplexer $56_T$ is a two-in to one-out selector. If read head $R_1$ is passing over the track, then the control signal instructs the multiplexer $56_T$ to select and output the signal from the relative value analysis circuit $55_1$ as the error signal $E_T$. If read head $R_3$ is passing over the track, then the control signal instructs the multiplexer $56_T$ to select and output the signal from the relative value analysis circuit $55_2$ as the error signal $E_T$.

The multiplexer $56_T$ supplies the error signal $E_T$ to the negative input of a summation circuit $57_T$. The multiplexer $56_B$ supplies the error signal $E_B$ to the positive input of the summation circuit $57_T$. The difference between the top and bottom error signals ($E_B$-$E_T$) represents an error in the alignment of the ASHA axis with the center of the information arc being read. The output of the summation circuit $57_T$ therefore is the position error signal (PES) for the tilt angle control loop. For example, if the read head passes over the same proportional amounts of the A and B servo bursts at both the top and the bottom of a given track, then the error signal is 0.0 indicating correct position or angular alignment.

The PES signal for tilt angle control goes to the control circuit of FIG. 6. In that circuit, the LS1 tilt servo control (microcode loop) 71 adjusts the analog position error signal supplied to summation circuit 73. The output of that summation circuit 73 goes to the analog position loop 61 to thereby control the tilt motor 31 to maintain the proper pointing alignment of the ASHA axis with the center of the information arc being read.

As will be apparent to those skilled in the art, the present invention is amenable to a number of modifications. For example, instead of using only two of four of the write heads to write servo signals, all four of the write heads could write servo signals. Write heads $W_1$ and $W_3$ could write data tracks followed by the lower servo signals, and write heads $W_2$ and $W_4$ could write the upper servo signals followed by data tracks. Each combination data and servo track would trim or overlap the immediately preceding track to some extent. All four read heads would read servo and data information.

Although the present invention has been described and illustrated in detail, it is clearly understood that the same is by way of illustration and example only and is not to be taken by way of limitation, the spirit and scope of the present invention being limited only by the terms of the appended claims.

I claim:

1. A method of controlling operations of a scanner system scanning a moving recording medium comprising the steps of:
   passing a read head over a predetermined track recorded on the medium and partially overlapping a track adjacent the predetermined track on the medium;
   determining a first time window and a second time window based on a detected passage of the read head over a detectable stripe that is prerecorded substantially along a length of the medium;
   during the first time window in which the read head completely passes over a servo burst region of the predetermined track taking a first sample amplitude of servo burst signal from the read head;
   during the second time window in which when the read head completely passes over a servo burst region of the adjacent track, taking a second sample amplitude of servo burst signal from the read head, wherein passage of the read head over the servo burst region of the adjacent track is excluded during the first time window and passage of the read head over the servo burst region of the predetermined track is excluded during the second time window; and
   controlling a parameter of operation of the scanner system in response to a relationship of the first sample amplitude to the second sample amplitude.

2. A method as in claim 1, wherein the medium comprises a recording tape.

3. A method as in claim 1, wherein the step of controlling comprises adjusting the speed of the moving recording medium relative to a scanner head assembly containing at least the read head in response to the relationship of the first sample amplitude to the second sample amplitude.

4. A method as in claim 1, wherein the step of controlling comprises adjusting a positional alignment of an arcuate scanner head assembly comprising at least the read head relative to the moving recording medium.

5. A method as in claim 4, wherein the step of adjusting a positional alignment of the arcuate scanner head assembly comprises adjusting a tilt angle of the arcuate scanner head assembly.

6. A method as in claim 1, wherein the first time window precedes the second time window.

7. A method as in claim 1, wherein the second time window precedes the first time window.

8. A method as in claim 1, wherein the first and second time windows precede a time window during which the read head is expected to pass over a data region of the predetermined track.

9. A method as in claim 1, wherein the first and second time windows follow a time window during which the read head is expected to pass over a data region of the predetermined track.

10. A method as in claim 1, wherein the moving recording medium comprises a longitudinally moving magnetic tape.

11. A method as in claim 1, wherein:
   the step of taking a first sample amplitude comprises sampling signals from the read head within one predetermined passband frequency range; and
   the step of taking a second sample amplitude comprises sampling signals from the read head within said one predetermined passband frequency range.

12. A method as in claim 1, further comprising the steps of:
   determining a third time window and a fourth time window based on the detected passage of the read head over the detectable stripe;
   during the third time window when the read head passes over a second servo burst region of the predetermined track, taking a third sample amplitude of servo burst signal from the read head;
   during the fourth time window when the read head passes over a servo burst region of the adjacent track, taking a fourth sample amplitude of servo burst signal from the read head; and
   controlling a parameter of operation of the scanner system in response to a relationship of the third sample amplitude to the fourth sample amplitude.

13. A method as in claim 1, further comprising the steps of:
   passing another read head over another predetermined track recorded on the medium and partially overlapping a track adjacent said another predetermined track on the medium;
   during a third predetermined time window when said another read head passes over a servo burst region of said another predetermined track, taking a third sample amplitude of servo burst signal from said another read head;
   during a fourth predetermined time window when said another read head passes over a servo burst region of the track adjacent said another track, taking a fourth sample amplitude of servo burst signal from said another read head; and
   controlling a parameter of operation of the scanner system in response to a relationship of the third sample amplitude to the fourth sample amplitude.

14. An arcuate scanning system, comprising:

an arcuate scanner having a plurality of scanner heads, the arcuate scanner performing read and write operations on a recording tape;

a circuit responsive to read signals from one of the heads for detecting signals of a predetermined frequency;

a circuit responsive to read signals from the head for detecting a passage of the head over a detectable stripe that is prerecorded substantially along a length of the recording tape, and determining a first time window and a second time window based on the detected passage of the head over the detectable stripe;

a circuit for (1) sampling amplitude of the detected signals of a predetermined frequency during the first time window to produce a first sample amplitude and (2) sampling amplitude of the detected signals of a predetermined frequency during the second time window to produce a second sample amplitude, wherein the signals detected during the first time window, in which the read head completely passes over the servo burst region of the predetermined track, are excluded from being detected during the second time window, in which the read head completely passes over the servo burst region of the adjacent track, and wherein the signals detected during the second time window are excluded from being detected during the first time window;

a circuit responsive to a relationship between the first and second sample amplitudes for generating a position error signal; and a control circuit for controlling at least one operational parameter of the arcuate scanning system in response to the position error signal.

15. A system as in claim 14, wherein the control circuit comprises:

a tape drive motor; and a circuit controlling the speed of the tape drive motor in response to the position error signal.

16. A system as in claim 14, wherein the control circuit comprises:

a position alignment system coupled to the arcuate scanner to selectively align the arcuate scanner with regard to the recording tape; and a circuit controlling the position alignment system in response to the position error signal.

17. A system as in claim 16, wherein the position alignment system comprises a tilt motor coupled to the arcuate scanner for selectively tilting the arcuate scanner at an angle with regard to the recording tape.

* * * * *